United States Patent Office 2,808,332
Patented Oct. 1, 1957

2,808,332

PROCESS FOR FEEDING RUMINANTS AND IMPROVED FEED SUPPLEMENT THEREFOR

Philip C. Anderson and Janet L. C. Rapp, Crete, Nebr., assignors to Feed Service Corporation, Crete, Nebr., a corporation of Nebraska No Drawing. Application February 17, 1955,
Serial No. 488,973

21 Claims. (Cl. 99—2)

Our present invention relates to an improved process for feeding ruminants and to a novel feed supplement therefor.

Ruminants include cattle, sheep, camels, goats, bison, and others. For purposes of illustrating our invention, it will be specifically exemplified in connection with its application to cattle.

As is well known, the raising of cattle for meat production is beset by a number of problems. One of the chief problems in this connection is the most economical utilization of feed ingested by the cattle. The normal period required in raising a new-born calf to a slaughter-size animal is about 2¾ years. During part of this period the cattle are fed naturally-occurring, relatively expensive, nitrogen containing products, such as linseed meal. In addition to their costs, the use of such products is disadvantageous because it involves a deterioration of the quality of land, which is a factor of increasing concern to many, not only in the U. S. A. but elsewhere.

With this problem in mind, various feed supplements have been suggested. They have met with varying degrees of success. Indeed, the best previous results of which we are aware involve a 2¼ year cattle processing period, the final feeding phase being an 80-day grain-feeding operation for preparation of the animal to slaughter stage.

Also, so far as we are aware none of the prior feed supplements has been formulated with reference to the O–R potential and control of microfloral respiration. We have made the discovery that feeds embodying such considerations result in maximum production of meat by cattle in minimum periods at economic costs. More particularly, we have discovered that the monohydric alcohol, ethanol, has the unexpected property, when incorporated in a feed supplement of maintaining a low O–R potential, in the rumen. We have discovered that the rumen should have an O–R potential from −0.4 to −0.2 volts.

We have tested our finding in connection with various feed supplements and have found that in all cases satisfactory results were obtained.

In accordance with the foregoing an object of our invention is the provision of a process and composition for use as a feed supplement in order to obtain maximum economic food production from the ruminants in minimum periods. Another object of this invention is to increase the utilization by ruminants of materials such as synthetic nitrogeneous materials, and cellulose and other inexpensive natural ruminant feed-stuffs.

The foregoing and other objects have been attained in accordance with our present invention. We incorporate ethanol in a ruminant feed supplement by mixing it with other substances which are also nutritiously advantageous to the ruminant and its symbiotic microflora, the whole mixture having certain physical characteristics which are advantageous to the feeder as well.

This supplement can be fed directly to ruminants or it can be mixed with molasses and/or minerals and/or vitamins to form a more complex supplement.

Any grain alcohol, synthetic ethanol, with or without suitable denaturants, can be used. One suitable denaturant is Formula SDA 35A (Alcohol and Tobacco Tax Division, Internal Revenue Service, U. S. Treasury Dep't.).

We have incorporated ethanol in feed supplements containing synthetic sources of nitrogen, such as urea, ammonia, ammonium propionate, and ammonium phosphate; and phosphoric acid; molasses; vitamins A, D, E and trace minerals per se or in admixture. Reasonable agitation is required.

By our present invention, we have succeeded in reducing in an economic manner the aforesaid processing period to 15 months and this result has been attained with the socially-desirable avoidance of use of soil depleting N-containing products.

We are aware that ethyl alcohol is a common article of commerce and also that distillery slop, a by-product of the production of alcohol by fermentation processes, has found some use in the feeding of animals. However, though we have made diligent search therefor, we have failed to find any suggestion that the common ethanol could be incorporated in feed supplements for ruminants with its consequent unexpected advantages. Furthermore, as to the use of distillery slop in animal feeds, the prime object of the process in which the slop is formed is to avoid any residual ethyl alcohol remaining in the slop. It has never been suggested to employ such slop in conjunction with low quality proteins such as peanut oil meal and cottonseed oil meal, and synthetic N-containing substances such as urea and other substances, hereinafter specifically noted, as components of feed supplements. Nor has any disclosure concerning distillery slop enabled the attainment of the above-indicated advantageous results. We have further found that the incorporation of ethyl alcohol in feeds for ruminants does not result in overeating on the part of the ruminants and, indeed, the surprising result has been observed that even when fed free choice, i. e. practically unlimited quantities of ethanol-containing feed supplement are offered to the cattle, the latter ingest only such quantities of such feed supplement as can be utilized by the rumen microflora to yield optimum growth conditions. It appears, therefore, that ruminants have the ability to use the ethanol in ethanol-containing feed supplements in a unique manner.

An idea of the complexity of the problem of developing feed supplements for ruminants can be gleaned from a consideration of some of the requirements of any additive intended for incorporation in the feed. These requirements include:

1. The additive should not be so palatable to the ruminant that the latter will over-indulge to its detriment.
2. The additive should assist the ruminant's symbiotic digestive system so as to increase the appetite of the ruminant for inexpensive roughage, such as corn cobs.
3. The additive should preferably be a liquid so as to be in harmony with the known advantages of liquid feeds.
4. The additive should not contribute any residues in the ruminant which have toxic effects on man. Certain animal hormones are disadvantageous in this respect.
5. The additive should not cause a down-grading of carcass grades but desirably improve them. Certain thiol compounds and certain animal hormones are deleterious in this regard.
6. The additive should not cause the feed supplement to be less palatable.
7. The additive should be non-toxic to the ruminant and its microflora in the amounts ingested.
8. The additive must be compatible with the other ingredients in the feed supplement and not cause deterioration during periods of storage.

9. The additive must be economically feasible in the amounts employed.

We have found that ruminants being fed ground corn cobs choose to ingest 1/15 pound of ethanol per 100 pounds of bodyweight per day after getting "on feed." We have further determined that this level best promotes optimum conditions in the rumen.

The state of oxidation of the protein and roughage which the feeder intends to supplement with the ethanol-containing mixture affects the percent of ethanol of the dry substance in the ration which produces optimum results. Those cattle offered roughage in a low (reduced) state of oxidation will choose to consume less ethanol than those with roughage in a high stage of oxidation. Protein affects the ethanol requirement in a like manner.

For the well-being of ruminants a gradual changing of their ration from an ethanol-free ration to one containing ethanol is important. Normally, each animal will refuse to change his feed rapidly and will make the adjustment himself providing he is given sufficient freedom of selection of feedstuff to permit him to do so.

In view of the varied conditions under which our present invention may be utilized it is not possible to set forth with the desired exactitude and certainty the proportions in which the various feed components may be employed. This will be readily appreciated when one considers that the ethanol may be incorporated with one or more components to produce a partial feed supplement (Example 3) or a total feed supplement (Example 1, B). Then, too, the cattle may be fed, free choice, one feed supplement (Example 7) along with other parts of the ration, or they may be similarly fed two feed supplements (Example 1) along with other parts of the ration. If desired, the supplement may be incorporated with roughage and fed to the cattle in that manner (Example 6). Since the identity and nature of co-fed proteins and the solubility and fermentability of co-fed carbohydrates also vary it will be understood that the compositions of our present invention will advantageously vary also.

In spite of the numerous factors mentioned, and others, the practical utilization of our inventive concept is easy of attainment. This is particularly true when cattle are fed free choice. For example, assume it is desired to feed cattle with 2 feed supplements, as A and B in Example 1, along with grain, silage or roughage. The two supplements and the co-fed substances are fed free choice. The cattle will select in a short period a certain ratio of A and B which ratio will be found to fit its needs best. If the cattle consume only the supplement B (containing alcohol) the question arises as to whether the cattle have a sufficient ratio of ethanol to N-containing substance for their needs. This can be easily ascertained by increasing the ethanol content until both supplements are being consumed by the cattle.

Once the proper balance of the two feed supplements has been ascertained it is a simple matter of arithmetic to calculate the proportions of the various ingredients of the cattle's ration actually being ingested. Then, if desired, the two supplements can be combined into one, using the data obtained; and the cattle may then be fed free choice with one feed supplement and co-fed materials; or the feed supplement and co-fed materials may be mixed together in the calculated amounts and fed in admixture to the cattle.

In general, employing the aforementioned methods, we have found that amounts of ethanol from about 1 to 12 parts by weight can be employed with 10 parts of urea to give satisfactory results. Excellent results have been obtained with from about 4 to 6 parts of ethanol to 10 parts of urea. Molasses can be employed in amounts from about 70–175 parts by weight to 10 parts of urea to give satisfactory results but we prefer to employ from 80–160 parts for best results. Phosphoric acid can be employed in amounts ranging from about ½ to 5 parts by weight to 10 parts of urea advantageously. Minerals, water, vitamins and other special purpose additives can be employed in desired amounts.

While we have mentioned urea, molasses and phosphoric acid hereinabove it will be understood that other materials may be used in their places in equivalent amounts. In place of urea, for example, we may employ other substances which we term as sources of synthetic nitrogen. They include ammonium phosphate, ammonium carbonate and ammonium propionate. In general, any N-containing compound, which when hydrolyzed or enzymatically split in the rumen yields ammonia, may be used.

Molasses in its various commercial forms has been found to be usable in accordance with our invention. Specific examples of such forms include beet final molasses, Steffen's molasses, black strap molasses, citrus molasses, high test molasses, corn molasses and wood molasses.

In place of phosphoric acid we may employ its nutritional equivalents such as ammonium phosphate, sodium phosphate and calcium phosphate.

As examples of minerals employed in small amounts in accordance with our invention we mention potassium iodide, sodium iodide, zinc sulfate, zinc carbonate, or any zinc salt the anion of which is compatible in the rumen, for example, zinc acetate. Corresponding copper, cobalt, manganese, magnesium, or iron compounds may be used in addition to the zinc compounds.

All vitamins tried by us have been found to be usable in conjunction with our present invention. Examples of such vitamins include A, B (series), C, D and E.

The following examples, in which parts are by weight, are given in order to illustrate the invention and not for purposes of limitation.

*Example 1*

Six head of cattle were fed, free choice, corn cobs, ground limestone and liquid supplement A, the latter consisting of:

| | Parts |
|---|---|
| Molasses, black strap | 80 |
| Urea | 10 |
| Phosphoric acid (75%) | 3 |
| Water | 6½ |

To each 100 pounds of the above mix minerals and vitamin A were added as follows:

| | |
|---|---|
| Ferrous sulfate cont'g. 20% Fe | gms__ 2.075 |
| Zinc sulfate cont'g. 36% Zn | gms__ 9.275 |
| Manganese sulfate cont'g. 26% Mn | gms__ 9.612 |
| Copper sulfate cont'g. 25% Cu | gms__ 1.667 |
| Cobalt sulfate cont'g. 31% Co | gms__ 0.045 |
| Potassium iodide cont'g. 76% I | gms__ 0.685 |
| Vitamin A | I. U__ 1,000,000 |

Liquid supplement B was then introduced, free choice, so that after this addition all the cattle were fed, free choice, four separate items: corn cobs, ground limestone, supplement A and supplement B.

Supplement B consisted of supplement A mixed with ethanol as follows: to each 100 parts by weight of supplement A, was added 8 parts by weight of 95 percent ethanol.

The cattle gradually increased their intake of supplement B from zero to a fixed ratio of the two supplements. This ratio was two pounds of supplement A for each five pounds of supplement B. The cattle continued to select this ratio over several weeks (40 days).

The cattle appeared in good health and had made good gains,

Example 2

Six head of cattle were fed the following daily ration:

Alfalfa hay, 3 pounds
Ground corn cobs, free choice
Supplement A (same as Example 1), free choice The cattle consumed 11 gallons of water a day per head at the start of this experiment. Supplement B (Ex. 1) was then separately introduced free choice in addition to the other substances.

The cattle gradually increased their intake of supplement B from near zero to a fixed ratio of supplement A to supplement B. This ratio was now one part of supplement B to two parts of supplement A.

The water consumed dropped to less than 6 gallons per head per day at which level it was maintained for several weeks (40 days).

The cattle were in good health and had made good gains.

Example 3

150 pounds of ammonia water containing 16 percent nitrogen were mixed with 25 pounds of 95 percent ethanol. This supplement was then shipped to a western feed lot where it was incorporated into wet molasses beet pulp (75% water) and fed to 10 steers. One and three-fourths pounds of the clear liquid supplement was mixed with approximately 45 pounds of the wet beet pulp silage, constituting one steer's daily ration. Ground bone meal and table salt were each fed free choice.

The supplemented wet beet pulp silage was more palatable than the unsupplemented silage and the cattle made excellent gains when fed additional dried beet pulp which they seemed to relish.

Example 4

A supplement consisting of 100 pounds of 16 percent nitrogen ammonia water and 25 pounds of 95 percent ethanol was prepared. This supplement was shipped to a western feed lot and incorporated into a wet molasses beet pulp at the rate of one and one-quarter pounds of supplement to 45 pounds of wet silage. It was fed to a number of steers who also had bone meal and trace mineralized salt offered free choice. Each steer consumed approximately 46 pounds of the mixture per day.

The wet pulp silage with the added supplement was more palatable than unsupplemented silage and the cattle made excellent gains when fed additional dried beet pulp which they ate with evident relish.

Example 5

Six head of cattle were initially fed the following ration for 5 days:

Dried prairie hay, free choice
Bone meal, free choice
Common table salt, free choice
Supplement (C) consisting of: 90 percent molasses, and 10 percent urea, free choice Then the cattle were offered the following supplement free choice, in addition to the foregoing ration: supplement (D): 100 parts of supplement C by weight and 5 parts of 95 percent ethanol by weight.

The cattle gradually changed rations over a 2 day period until they were eating only supplement D and would wait for the supplement D container to be filled at the regular daily time rather than eat supplement C. The cattle consumed one and eight-tenths pounds of supplement per head per day and gained one and four-tenths pounds per head per day over a six weeks period when on supplement D.

Example 6

A supplement consisting of two parts of urea, one part of 95 percent ethanol and four parts of water was shipped to a feeder who mixed it with molasses in a ratio of ten parts of supplement to 20 parts of molasses. He then fed this mixture to 10 steers at the rate of 2 pounds of molasses-urea-ethanol mixture per head per day, admixed with 20 pounds of ground ear corn. The cattle were put "on full feed" (given free access to unlimited amounts of the mixed feed) in only three days and continued to make excellent gains and appeared thrifty and well satisfied throughout the whole feeding period.

Example 7

A supplement consisting of 10 parts of urea, 6 parts of 95% ethanol, 4 parts of phosphoric acid (75%) and 10 parts of water was shipped in cold weather (20° F.) to a feed manufacturer who mixed this clear liquid mixture with 80 Brix molasses in the ratio of 3 parts of clear liquid to 7 parts of molasses.

The resulting supplement was fed to 8 head of cattle, free choice, weighing about 600 pounds each. Western prairie hay was fed free choice.

The cattle consumed 2.9 pounds per head per day of supplement and made gains comparable to those experienced with good quality feed lot rations composed principally of grain. It was found that the average daily gain was 1.8 pounds per head per day for a 60 day period.

As above indicated the formulations within the scope of this invention are based on considerations involving the O-R potential as it influences microfloral respiration. While we believe that these considerations are valid it is understood that we do not wish to be limited to the theoretical concepts involved. Nevertheless, as aforesaid, we do believe it will aid in an understanding of our present invention if we relate here some of these theoretical considerations which we believe to be applicable.

The science of nutrition consists of an understanding of the chemical composition of all food taken by the organism with an inspection to insure that provision is made for all the needs of that organism. Some of this food must be oxidized to provide energy for the necessary activities of the animal. Producers of livestock are interested in having the remainder of the food retained, that is, utilized in the most efficient manner to build new protoplasm.

The nutrition of ruminants, furthermore, is dependent upon the microflora inhabiting the rumen, because these microorganisms digest and assimilate or discard all food entering the rumen. Later, in the abomasum these microorganisms are in turn digested by the host. Therefore, it is necessary to cultivate nutritionally a microfloral crop which when hydrolyzed and assimilated provides all of the nutritional substances necessary for optimum metabolism of the host animal.

Furthermore, the rumen microorganisms, under suitable conditions synthesize proteins, fats, and certain vitamins from elements and compounds provided them in the diet of their host. The science of the nutrition of ruminants, therefore, includes an understanding of the proper chemical conditions within the rumen, because even though the microflora are chemically capable of synthesizing certain molecules, their level of production, efficiency, and/or rate of synthesis is drastically influenced by certain dietary constituents.

Observations of the rumen symbionts show that they are facultative, that is, they are capable of carrying on either aerobic or anaerobic respiration.

The microorganisms, however, cannot sufficiently synthesize some of the amino acids needed from urea and carbohydrate when living aerobically, lacking unoxidized hydrogen.

In order to obtain the necessary unoxidized hydrogen, the medium is made more anaerobic by the host by increasing water ingestion. Ethanol is then produced by glucose fermentation.

The fermentation of glucose to alcohols also produces large quantities of certain non desirable by-products which are utilized but little by the ruminant or its microflora and therefore constitute lost nutrients of substantial magnitude.

These losses are lessened if the hydrogen rich ethanol is present in the original food ingested, thereby minimizing this anaerobic respiration which is otherwise necessary to produce the ethanol required for aerobic synthesis.

The different water requirements of the ruminant can be observed by adding or withdrawing the ethanol. This conservation of water is especially important where drouth conditions prevail.

Natural plant proteins are made up of a number of kinds of amino acids in varying proportions. Some amino acids are richer in unoxidized hydrogen than others. Therefore some proteins are richer in unoxidized hydrogen than others. Hence protein may be in a relatively high or low state of oxidation. Urea is a comparatively poor source of unoxidized hydrogen. Hydrogen is made available from the ethanol by coenzyme I (cozymase) in the presence of certain proteins resulting in acetaldehyde which is further oxidized or used in protein synthesis:

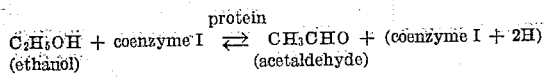
$$C_2H_5OH + \text{coenzyme I} \underset{\text{(ethanol)}}{\overset{\text{protein}}{\rightleftarrows}} CH_3CHO + (\text{coenzyme I} + 2H)$$
(acetaldehyde)

While we have described our invention in detail in its preferred embodiments, it will be obvious to those skilled in the art, after understanding our invention, that various changes and modifications may be made therein without departing from the spirit or scope thereof. We aim in the appended claims to cover all such modifications and changes.

We claim:

1. The improvement in the preparation of a feed for ruminants, which comprises incorporating in a feed for ruminants a source of synthetic nitrogen and an amount of ethanol effective to increase the nitrogen-retention ability of the ruminants.

2. The improvement in the preparation of a feed for ruminants, which comprises incorporating in a feed for ruminants urea and an amount of ethanol effective to increase the nitrogen-retention ability of the ruminants.

3. The improvement in the preparation of a feed for ruminants, which comprises incorporating in a feed for ruminants urea, phosphoric acid and an amount of ethanol effective to increase the nitrogen-retention ability of the ruminants.

4. The improvement in the preparation of a feed for ruminants, which comprises incorporating in a feed for ruminants a source of non-proteinaceous nitrogen, molasses and an amount of ethanol effective to increase the nitrogen-retention ability of the ruminants.

5. The improvement in the preparation of a feed for ruminants, which comprises incorporating in a feed for ruminants urea, phosphoric acid, molasses and an amount of ethanol effective to increase the nitrogen-retention ability of the ruminants.

6. The improvement in the preparation of a feed for ruminants, which comprises incorporating in a feed for ruminants urea, phosphoric acid, molasses, vitamins and an amount of ethanol effective to increase the nitrogen-retention ability of the ruminants.

7. The improvement in the preparation of a feed for ruminants, which comprises incorporating in a feed for ruminants a source of non-proteinaceous nitrogen, a phosphate and an amount of ethanol effective to increase the nitrogen-retention ability of the ruminants.

8. A feed supplement for ruminants comprising a source of synthetic nitrogen and ethanol in an amount effective to increase the nitrogen-retention ability of ruminants.

9. A feed supplement for ruminants comprising a source of synthetic nitrogen and ethanol in an amount effective to increase the nitrogen-retention ability of ruminants said amount being from about 1 to 12 parts by weight per that amount of said source of synthetic nitrogen equivalent to 10 parts by weight of urea.

10. A feed supplement for ruminants comprising urea and ethanol in an amount effective to increase the nitrogen-retention ability of ruminants.

11. A feed supplement for ruminants comprising urea and ethanol in an amount effective to increase the nitrogen-retention ability of ruminants, said amount being from about 1 to 12 parts by weight per 10 parts by weight of urea.

12. A feed supplement for ruminants comprising urea, phosphoric acid and ethanol in an amount effective to increase the nitrogen-retention ability of ruminants.

13. A feed supplement for ruminants comprising urea, phosphoric acid and ethanol in an amount effective to increase the nitrogen-retention ability of ruminants, said amount being from about 1 to 12 parts by weight of ethanol per 10 parts by weight of urea per from about ½ to 5 parts by weight of phosphoric acid.

14. A feed supplement for ruminants comprising a source of non-proteinaceous nitrogen, molasses and ethanol in an amount effective to increase the nitrogen-retention ability of ruminants.

15. A feed supplement for ruminants comprising a source of non-proteinaceous nitrogen molasses and ethanol in an amount effective to increase the nitrogen-retention ability of ruminants, said amount being from about 1 to 12 parts by weight of ethanol per about 70 to 175 parts by weight of molasses.

16. A feed supplement for ruminants comprising urea, phosphoric acid, molasses and ethanol in an amount effective to increase the nitrogen-retention ability of ruminants.

17. A feed supplement for ruminants comprising urea, phosphoric acid, molasses and ethanol in an amount effective to increase the nitrogen-retention ability of ruminants, said amount being from about 1 to 12 parts by weight of ethanol per 10 parts by weight of urea, per ½ to 5 parts by weight of phosphoric acid per 70 to 175 parts by weight of molasses.

18. A feed supplement for ruminants comprising urea, phosphoric acid, molasses, vitamins and ethanol in an amount effective to increase the nitrogen-retention ability of ruminants.

19. A feed supplement for ruminants in accordance with claim 17, which supplement contains vitamins also.

20. A feed supplement for ruminants comprising a source of non-proteinaceous nitrogen, a phosphate and ethanol in an amount effective to increase the nitrogen-retention ability of ruminants.

21. A feed supplement for ruminants comprising a source of non-proteinaceous nitrogen, a phosphate and ethanol in an amount effective to increase the nitrogen-retention ability of ruminants, said amount being from about 1 to 12 parts of ethanol by weight per an amount of phosphate which is the nutritional equivalent of ½ to 5 parts by weight of phosphoric acid.

References Cited in the file of this patent

Winslow: Veterinary Materia Medica and Therapeutics, 8th Edition Revised, Am. Veterinary Pub. Co., Chicago, 1919, page 217.